US012728944B2

(12) United States Patent
Deguchi et al.

(10) Patent No.: US 12,728,944 B2
(45) Date of Patent: Sep. 8, 2026

(54) FRONT COWLING

(71) Applicant: SUZUKI MOTOR CORPORATION, Hamamatsu (JP)

(72) Inventors: Akihito Deguchi, Hamamatsu (JP); Tatsuya Yuse, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 307 days.

(21) Appl. No.: 18/430,869

(22) Filed: Feb. 2, 2024

(65) Prior Publication Data

US 2024/0262448 A1 Aug. 8, 2024

(30) Foreign Application Priority Data

Feb. 3, 2023 (JP) ................................ 2023-015567

(51) Int. Cl.
*B62J 17/10* (2020.01)
*B62J 17/02* (2006.01)
*B62J 17/04* (2006.01)

(52) U.S. Cl.
CPC ............... *B62J 17/10* (2020.02); *B62J 17/04* (2013.01)

(58) Field of Classification Search
None
See application file for complete search history.

(56) References Cited

U.S. PATENT DOCUMENTS 4,678,223 A * 7/1987 Kishi ........................ B62J 17/02 180/219
4,887,688 A * 12/1989 Horiike .................... B62J 17/10 280/288.4
2007/0257478 A1* 11/2007 Metzikis .................. B62J 17/02 280/770
2008/0289893 A1* 11/2008 Iwanaga ............. F02M 35/162 180/229
2009/0108621 A1* 4/2009 Matsuo .................... B62J 17/10 296/78.1
2016/0288853 A1* 10/2016 Ishii ......................... B62J 29/00
2019/0329833 A1 10/2019 Miki et al. ................. B62J 1/02
2022/0363323 A1* 11/2022 Scholz ................... B62D 37/00

FOREIGN PATENT DOCUMENTS

EP 0 911 249 B1 3/2003
EP 3 418 168 A1 12/2018
JP 2012-201288 A 10/2012
JP 2019-189089 A 10/2019

OTHER PUBLICATIONS

Extended European Search Report dated Jul. 1, 2024, issued to European Application No. 24155488.0.

* cited by examiner

*Primary Examiner* — Hung Q Dang
(74) *Attorney, Agent, or Firm* — Stein IP, LLC

(57) ABSTRACT

A front cowling includes a cowling panel that covers a front portion of a vehicle from the front and sides, and a wing that protrudes laterally from the cowling panel. The rear edge of the wing is located higher than a front edge of the wing. An air guide path is formed that takes in a traveling wind from the front of the vehicle and discharges the traveling wind as an airflow into a space below the wing.

10 Claims, 9 Drawing Sheets

FRONT COWLING

CROSS-REFERENCE TO RELATED APPLICATIONS

The disclosure of Japanese Patent Application No. 2023-015567 filed on Feb. 3, 2023, including specification, drawings and claims is incorporated herein by reference in its entirety.

TECHNICAL FIELD

The present invention relates to a front cowling.

BACKGROUND ART

A straddle-type vehicle equipped with a front cowling with wings is known (for example, see JP2019-189089A). In the straddle-type vehicle described in JP2019-189089A, a pair of wings protrude laterally from the surface of the front cowling, and the pair of wings are inclined rearward and upward in a cross-sectional view. When the pair of wings receives the traveling wind, downforce is generated on the pair of wings, which pushes down a vehicle body and increases the ground contact force of front wheels. In addition, the pair of wings rectify the traveling wind, and the traveling wind is directed toward the rear of the vehicle body, reducing air resistance.

SUMMARY OF INVENTION

Downforce increases the ground contact force of the front wheels and improves traveling stability, but when traveling straight at high speeds, it is more desirable to reduce running resistance than to obtain downforce.

The present embodiment has been made in view of the above points, and an object of the present embodiment is to provide a front cowling that can provide sufficient downforce when traveling at low speeds and reduce running resistance when traveling at high speeds.

A front cowling according to one aspect of the present embodiment is a front cowling including a cowling panel that covers a front portion of a vehicle from the front and sides, and a wing that protrudes laterally from the cowling panel, in which a rear edge of the wing is located higher than a front edge of the wing, and an air guide path is formed that takes in traveling wind from the front of the vehicle and discharges the traveling wind as an airflow into a space below the wing, thereby solving the above problem.

In the front cowling according to the one aspect of the present embodiment, since the rear edge of the wing is located higher than the front edge of the wing, when the wing receives the traveling wind, the pressure on the lower surface of the wing is lower than the pressure on the upper surface of the wing. Meanwhile, the traveling wind in the air guide path is discharged into the space below the wing as an airflow, increasing the pressure on the lower surface of the wing. When traveling at low speeds, the flow rate of the airflow discharged into the space below the wing is reduced, increasing the pressure difference between the upper and lower surfaces of the wing, and increasing downforce, which improves the operability and traveling stability of the straddle-type vehicle. When traveling at high speeds, the flow rate of the airflow discharged into the space below the wing increases, reducing the pressure difference between the upper and lower surfaces of the wing, and reducing downforce, which reduces the running resistance of the straddle-type vehicle.

DESCRIPTION OF EMBODIMENTS

A front portion of a vehicle is covered from the front and sides by a cowling panel of a front cowling according to one aspect of the present embodiment, and a wing protrudes laterally from the cowling panel. A rear edge of the wing is located higher than a front edge of the wing, when the wing receives the traveling wind, the pressure on a lower surface of the wing is lower than the pressure on an upper surface of the wing. In addition, an air guide path is formed in the front cowling to take in the traveling wind from the front of the vehicle, and the traveling wind in the air guide path is discharged as an airflow into a space below the wing, thereby increasing the pressure on the lower surface of the wing. When traveling at low speeds, the flow rate of the airflow discharged into the space below the wing is reduced, increasing the pressure difference between the upper and lower surfaces of the wing, and increasing downforce, which improves the operability and traveling stability of the straddle-type vehicle. When traveling at high speeds, the flow rate of the airflow discharged into the space below the wing increases, reducing the pressure difference between the upper and lower surfaces of the wing, and reducing downforce, which reduces the running resistance of the straddle-type vehicle.

EMBODIMENTS

First Embodiment

Figure 1:
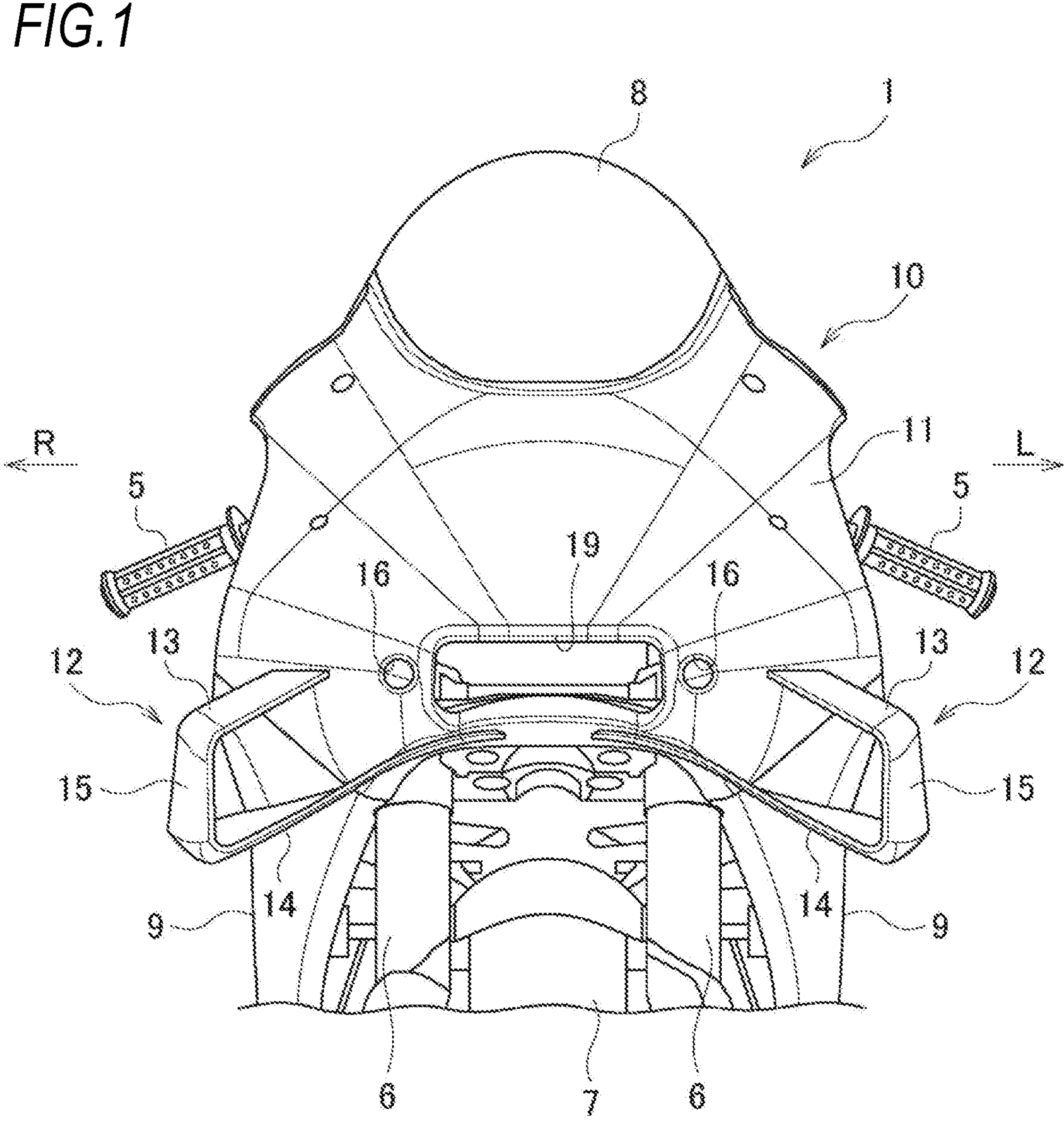
FIG. 1 is a front view of a front part of a straddle-type vehicle according to a first embodiment.

A straddle-type vehicle provided with a front cowling according to a first embodiment will be described below with reference to the accompanying drawings. FIG. 1 is a front view of a front part of the straddle-type vehicle according to the first embodiment. Further, in the following drawings, an arrow FR indicates the front of the vehicle, an arrow RE indicates the rear of the vehicle, an arrow L indicates the left side of the vehicle, and an arrow R indicates the right side of the vehicle.

As shown in FIG. 1, a front cowling 10 is attached to the front of a straddle-type vehicle 1, and a side cowling 9 is attached to the side of the straddle-type vehicle 1. A cowling panel 11 of the front cowling 10 extends outward in the vehicle width direction toward the rear, and the cowling panel 11 covers the front part of the vehicle from the front and sides. A handle 5 protrudes laterally from the cowling panel 11, and a front fork 6 protrudes downward from the cowling panel 11. A screen 8 is provided at the upper part of the cowling panel 11, and an air guide port 19 for an air box (not shown) is formed at the front surface of the cowling panel 11.

A pair of wings 12 protrude laterally from the cowling panel 11. Each wing 12 includes an upper wing 13 and a lower wing 14 facing each other in the vertical direction, and a side wing 15 connecting the distal ends of the upper wing 13 and the lower wing. The upper wing 13 is located on the side of the air guide port 19, and the lower wing 14 is located near the lower edge of the cowling panel 11. The rear edges of the upper wing 13 and the lower wing 14 are located higher than the front edges and are inclined rearward and upward. The upper wing 13 and the lower wing 14 are connected via the side wing 15, thereby increasing the rigidity of the entire wing 12.

In this front cowling 10, when the upper wing 13 and the lower wing 14 receives the traveling wind, a pressure difference is generated between the upper and lower surfaces of each wing due to the inclination of the upper wing 13 and the lower wing 14. The pressure on the upper surfaces of the upper wing 13 and the lower wing 14 increases, and the pressure on the lower surfaces of the upper wing 13 and lower wing 14 decreases, and thus, downforce is generated between the upper wing 13 and the lower wing 14 due to the pressure difference. A vehicle body is pushed down by the downforce of the upper wing 13 and lower wing 14, and the ground contact force of the front wheels 7 is increased, thereby improving the operability and traveling stability of the straddle-type vehicle 1.

Although the pair of wings 12 provides downforce, the running resistance experienced by the vehicle increases when traveling at high speed. An increase in running resistance has the advantage of decreasing acceleration and fuel efficiency. When traveling straight at high speeds, there are times when it is desirable to prioritize reducing running resistance rather than obtaining downforce. Therefore, in the front cowling 10 of the first embodiment, the traveling wind is taken in from the front of the vehicle, and this traveling wind is discharged from the lower surface of the upper wing 13 as an airflow, thereby increasing the pressure on the lower surface of the upper wing 13. When traveling at high speeds, the pressure difference between the upper and lower surfaces of the upper wing 13 is reduced, thereby reducing an increase in running resistance due to downforce.

Figure 2:
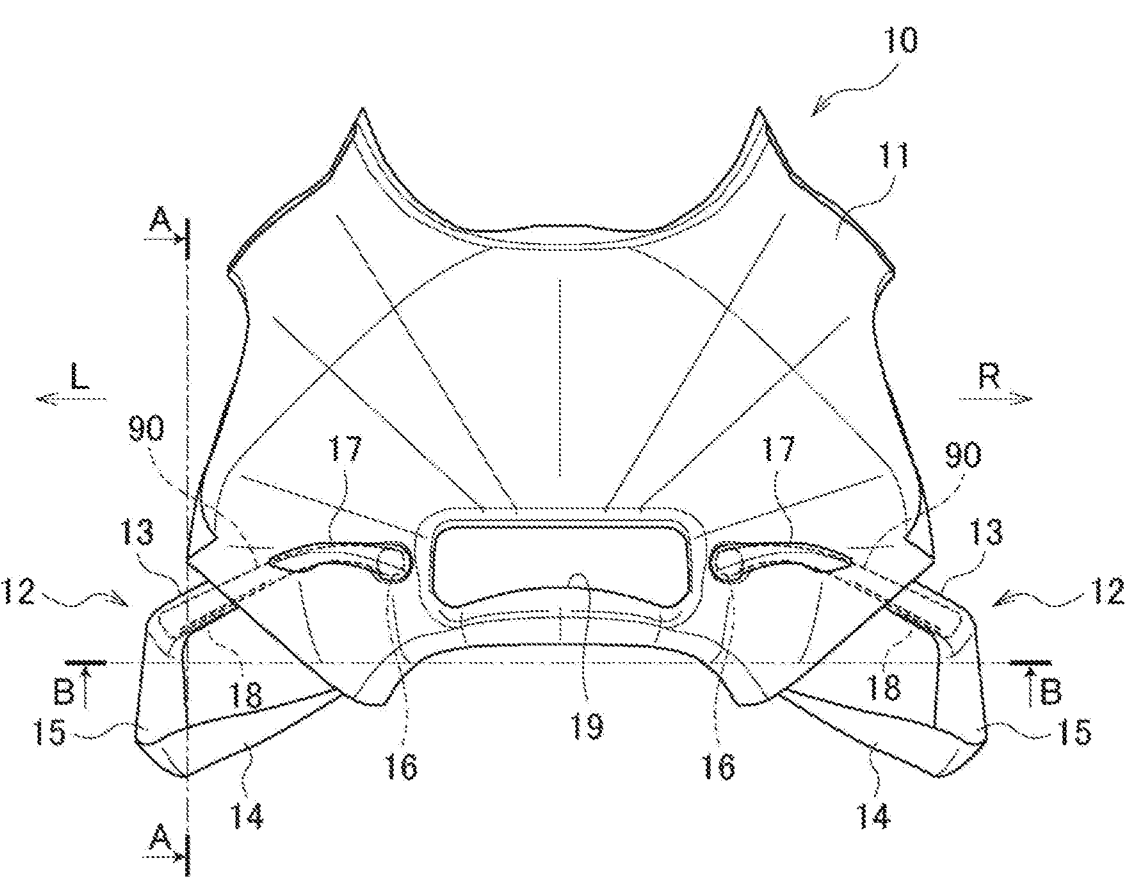
FIG. 2 is a rear view of a front cowling of the first embodiment.
Figure 3:
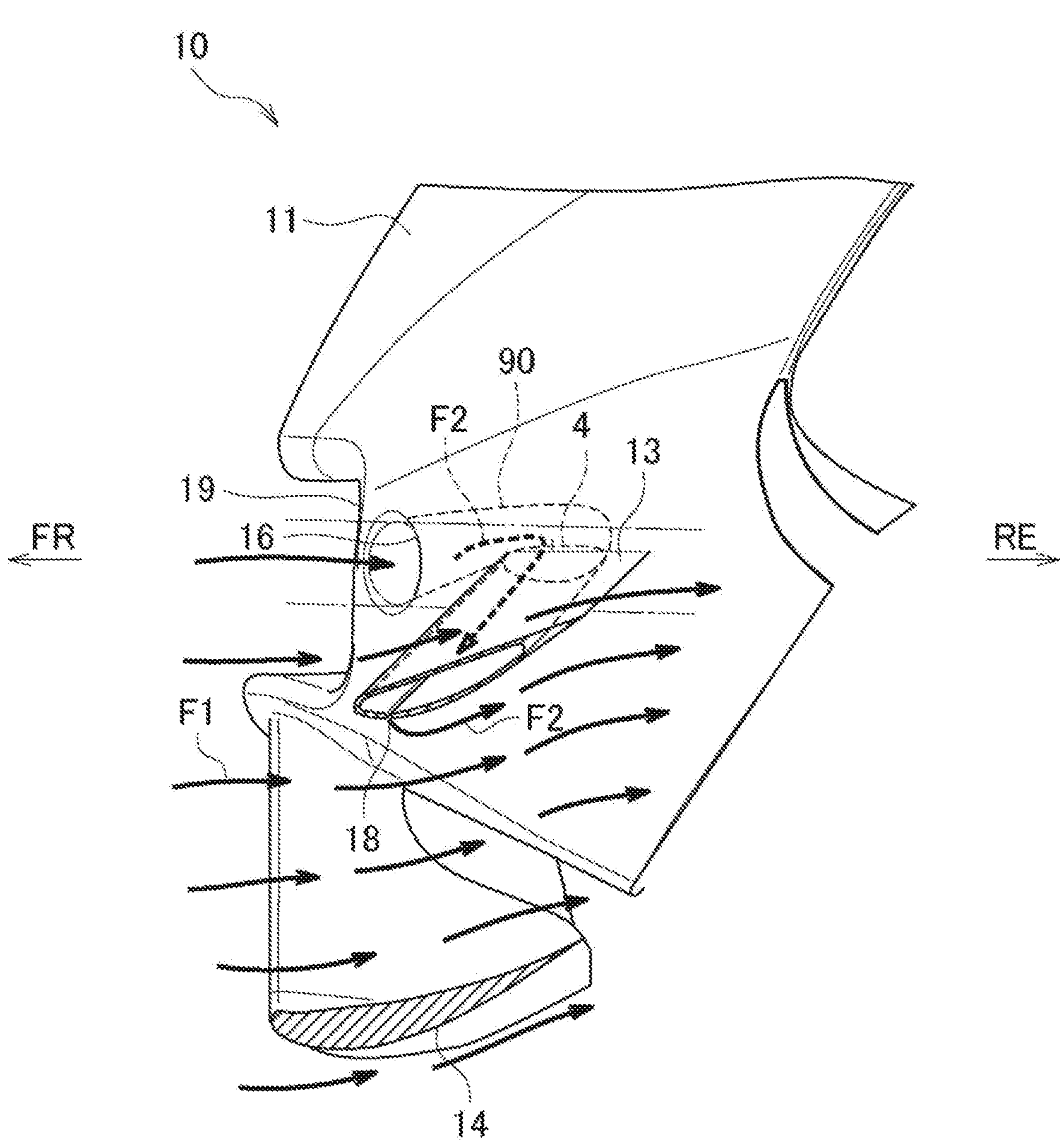
FIG. 3 is a cross-sectional view of the front cowling of FIG. 2 taken along line A-A.
Figure 4:
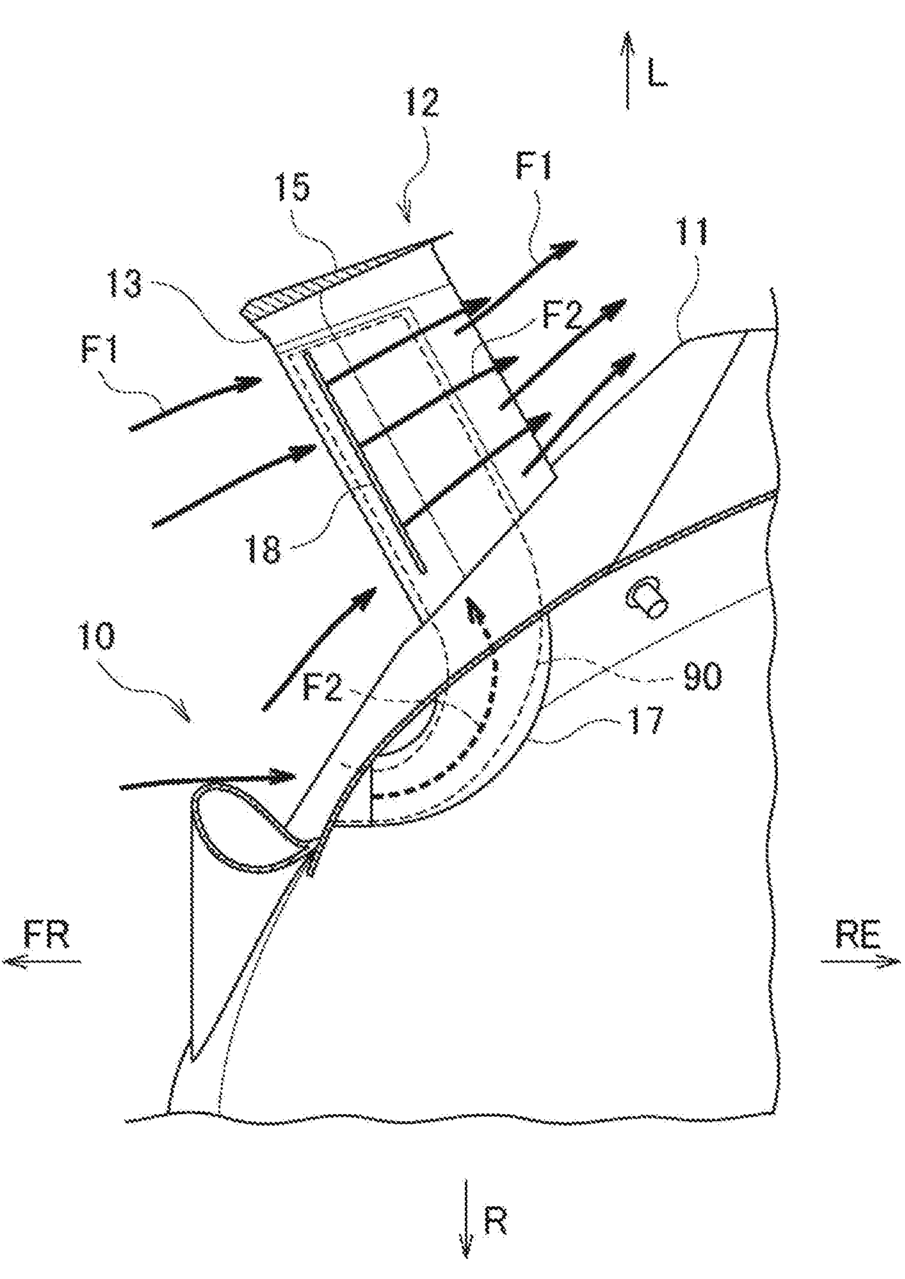
FIG. 4 is a cross-sectional view of the front cowling of FIG. 2 taken along line B-B.

The front cowling of the first embodiment will be described with reference to FIGS. 2 to 4. FIG. 2 is a rear view of the front cowling of the first embodiment. FIG. 3 is a cross-sectional view of the front cowling of FIG. 2 taken along line A-A. FIG. 4 is a cross-sectional view of the front cowling of FIG. 2 taken along line B-B.

As shown in FIGS. 2 and 3, circular intake ports 16 are formed in the cowling panel 11 on both sides of the air guide port 19. A pair of ducts 17 are provided inside the cowling panel 11. One end of the duct 17 is formed into a circular shape, and the other end of the duct 17 is formed into a substantially oblate shape. The one end of the duct 17 is connected to the circular intake port 16 of the cowling panel 11, and the other end of the duct 17 is connected to the substantially oblate base end of the upper wing 13. The base end of the upper wing 13 is open, and the upper wing 13 is formed hollow from the base end to the distal end. A slit-shaped discharge port 18 is formed on the lower surface of the upper wing 13.

An air guide path 90 is formed in the front cowling 10 from the intake port 16 toward the discharge port 18. Traveling wind F1 from the front of the vehicle is taken into the air guide path 90 from the intake port 16, and is discharged from the discharge port 18 into the space below the upper wing 13 as an airflow F2. The airflow F2 is directly discharged from the discharge port 18 into the space below the upper wing 13, increasing the pressure on the lower surface of the upper wing 13. The airflow F2 is discharged from the discharge port 18 even when traveling at low speeds, but when traveling at high speeds, the flow rate of the airflow F2 discharged from the discharge port 18 increases, thereby reducing the downforce caused by the pressure difference between the upper and lower surfaces of the upper wing 13.

Since the discharge port 18 is located closer to the front edge than the middle of the lower surface of the upper wing 13 in the front-rear direction, the airflow F2 can flow rearward along the lower surface of the upper wing 13. Further, the discharge port 18 is formed in a slit shape from the base end to the distal end of the upper wing 13 (see especially FIG. 4), and the airflow F2 can flow rearward over a wide range from the base end to the distal end of the upper wing 13. That is, the discharge port 18 is formed along the front edge of the upper wing 13. By flowing the airflow F2 along the entire lower surface of the upper wing 13, the pressure of the entire lower surface of the upper wing 13 is increased by the airflow F2.

Further, an upstream side of the air guide path 90 is formed inside the duct 17, and a downstream side of the air guide path 90 is formed inside the upper wing 13. A communication port 4 between the duct 17 and the upper wing 13 is located below the upper end of the intake port 16 and above the lower end of the intake port 16. The height difference between the intake port 16 and the communication port 4 is reduced, and the airflow F2 is smoothly guided from the intake port 16 through the communication port 4 to the discharge port 18. The duct 17 is curved in a circular shape when viewed from above, and the cross-sectional shape of the duct 17 gradually changes from a circle to a substantially oblate shape from upstream to downstream of the air guide path 90, and thus, the pipe resistance to the airflow F2 in the duct 17 is reduced.

As shown in FIGS. 3 and 4, the upper wing 13 and the lower wing 14 are connected via the side wing 15, and the traveling wind F1 flowing along the surface of the cowling panel 11 by the upper wing 13, the lower wing 14, and the side wing 15 is rectified. The upper surface of the upper wing 13 is inclined rearward and upward, and the lower surface of the upper wing 13 is curved in a circular shape so as to bulge downward. The upper surface of the lower wing 14 is curved and inclined rearward and upward in a concave manner, and the lower surface of the lower wing 14 is curved in a circular shape so as to bulge downward. The side wing 15 is inclined so as to expand outward in the vehicle width direction toward the rear.

When the straddle-type vehicle 1 is traveling, the traveling wind F1 flows along both the upper and lower surfaces of the upper wing 13, and the pressure on the lower surface is lower than the pressure on the upper surface due to the blade surface-shape of the upper wing 13. Further, the traveling wind F1 is taken into the duct 17 from the intake port 16 of the cowling panel 11, and the traveling wind F1 is sent into the inside of the upper wing 13, and is discharged as the airflow F2 from the discharge port 18 on the lower surface of the upper wing 13 into the lower space. By discharging the airflow F2 along the lower surface of the upper wing 13, the traveling wind F1 is completely removed from the lower surface of the upper wing 13, and the pressure on the lower surface of the upper wing 13 is increased.

When traveling at low speeds, the flow rate of the traveling wind F1 taken into the intake port 16 decreases, and the flow rate of the airflow F2 discharged from the discharge port 18 decreases. Therefore, the pressure difference between the upper and lower surfaces of the upper wing 13 is large, and sufficient downforce is generated in the upper wing 13, thereby improving the operability and traveling stability of the straddle-type vehicle 1. When traveling at high speeds, the flow rate of the traveling wind F1 taken into the intake port 16 increases, and the flow rate of the airflow F2 discharged from the discharge port 18 increases. Therefore, the pressure difference between the upper and lower surfaces of the upper wing 13 becomes smaller, the downforce generated in the upper wing 13 becomes smaller, and the running resistance of the straddle-type vehicle 1 is reduced.

The outer side of the space below the upper wing 13 in the vehicle width direction is partitioned into the side wing 15. Therefore, the airflow F2 discharged from the discharge port 18 into the lower space becomes difficult to diffuse outward in the vehicle width direction, and the traveling wind F1 is easily separated from the lower surface of the upper wing 13 by the airflow F2. The traveling wind F1 is flowing along both the upper and lower surfaces of the lower wing 14, and the pressure on the lower surface is lower than the pressure on the upper surface due to the blade surface-shape of the lower wing 14, and the sufficient downforce is generated in the lower wing 14 in response to this pressure difference. Therefore, the operability and traveling stability of the straddle-type vehicle 1 are ensured even when traveling at high speeds.

As described above, with the front cowling 10 of the first embodiment, the pressure difference between the upper and lower surfaces of the upper wing 13 increases when traveling at low speeds, and the operability and traveling stability of the straddle-type vehicle 1 can be improved due to downforce. When traveling at high speeds, the pressure difference between the upper and lower surfaces of the upper wing 13 becomes smaller, and the running resistance of the straddle-type vehicle 1 caused by downforce can be reduced.

Second Embodiment

Figure 5:
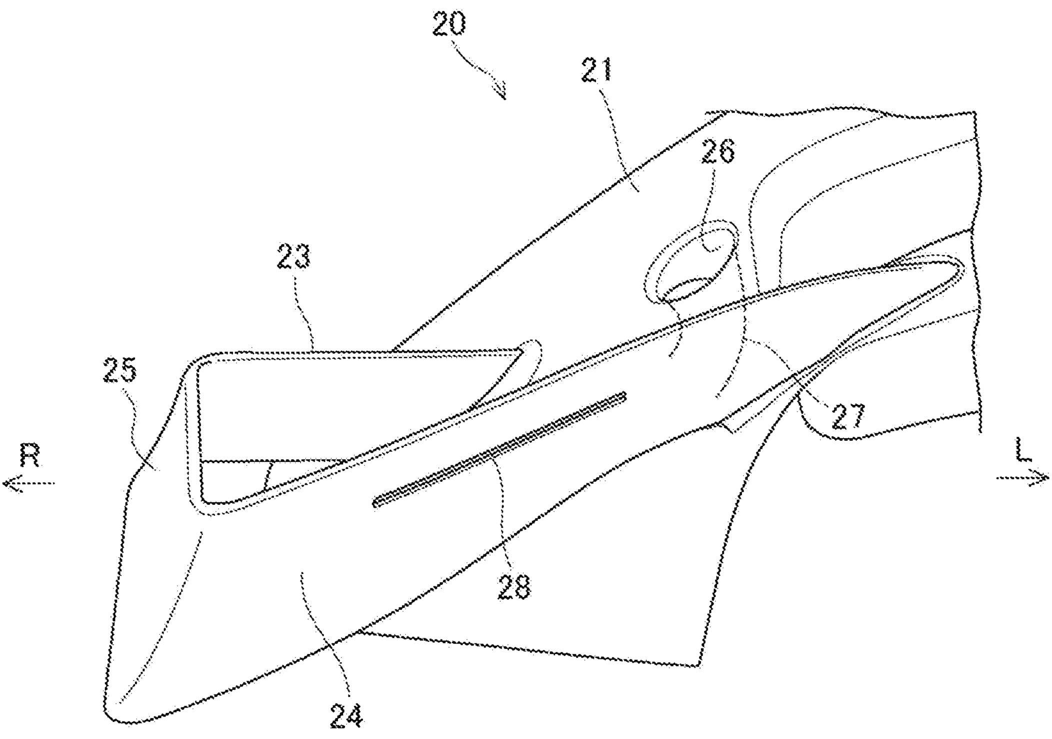
FIG. 5 is a perspective view of a front cowling according to a second embodiment as viewed diagonally from below.

Next, a front cowling of a second embodiment will be described with reference to FIG. 5. The front cowling of the second embodiment differs from the front cowling of the first embodiment in that a discharge port is formed in the lower wing. Therefore, in the second embodiment, descriptions of the same configurations as in the first embodiment will be omitted as much as possible. FIG. 5 is a perspective view of the front cowling according to the second embodiment as viewed diagonally from below.

As shown in FIG. 5, an upper wing 23 and a lower wing 24 protrude from a cowling panel 21 of a front cowling 20 on both sides, and the upper wing 23 and the lower wing 24 are connected via a side wing 25. A duct 27 is provided inside the cowling panel 21. One end of the duct 27 is connected to a circular intake port 26 of the cowling panel 21, and the other end of the duct 27 is connected to a substantially oblate base end of the lower wing 24. The base end of the lower wing 24 is open, and the lower wing 24 is formed hollow from the base end to a distal end. A slit-shaped discharge port 28 is formed on the lower surface of the lower wing 24 along the front edge.

When traveling at low speeds, the flow rate of the airflow discharged from the discharge port 28 decreases, and the pressure difference between the upper and lower surfaces of the lower wing 24 increases, and sufficient downforce is generated in the lower wing 24, thereby improving the operability and traveling stability of the straddle-type vehicle. When traveling at high speeds, the flow rate of the airflow discharged from the discharge port 28 increases, the pressure difference between the upper and lower surfaces of the lower wing 24 becomes smaller, and the downforce generated in the lower wing 24 becomes smaller, thereby reducing the running resistance of the straddle-type vehicle. Since sufficient downforce is generated in the upper wing 23, the operability and traveling stability are ensured even when traveling at high speeds.

As described above, also with the front cowling 20 of the second embodiment, the operability and traveling stability of the straddle-type vehicle can be improved by downforce when traveling at low speeds, and the running resistance of the straddle-type vehicle due to downforce can be reduced when driving at high speeds.

Third Embodiment

Figure 6:
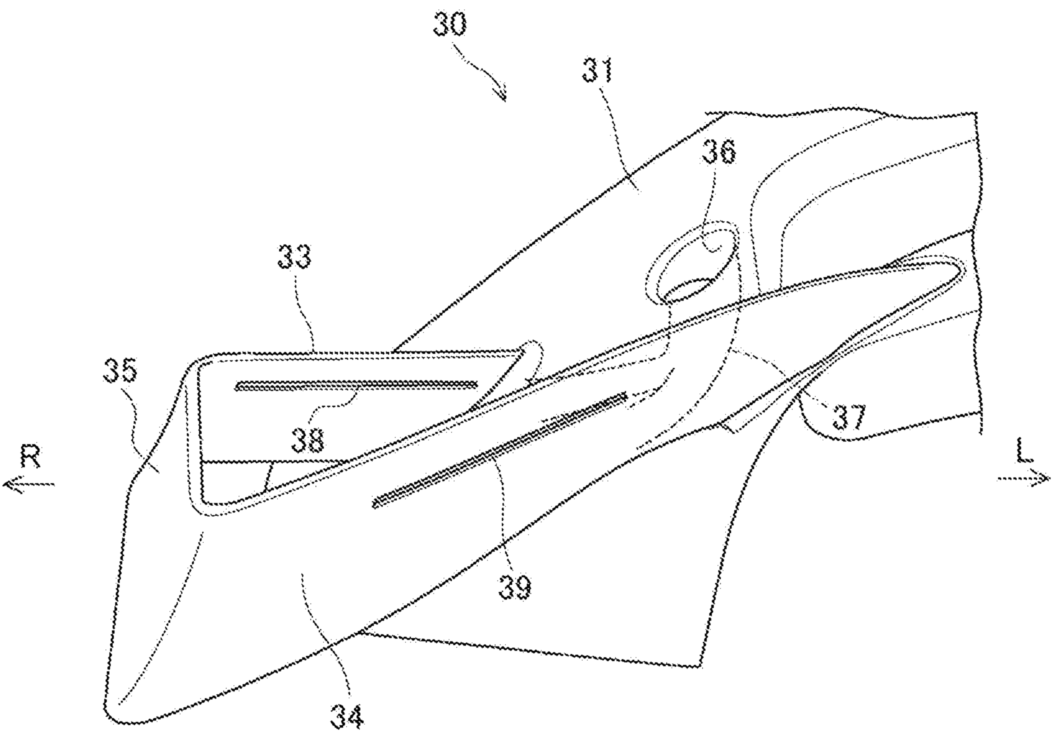
FIG. 6 is a perspective view of a front cowling according to a third embodiment as viewed diagonally from below.

Next, a front cowling of a third embodiment will be described with reference to FIG. 6. The front cowling of the third embodiment differs from the front cowling of the first embodiment in that discharge ports are formed in the upper wing and the lower wing. Therefore, in the third embodiment, descriptions of the same configurations as in the first embodiment will be omitted as much as possible. FIG. 6 is a perspective view of the front cowling according to the third embodiment as viewed diagonally from below.

As shown in FIG. 6, an upper wing 33 and a lower wing 34 protrude from a cowling panel 31 of a front cowling 30 on both sides, and the upper wing 33 and the lower wing 34 are connected via a side wing 35. A pair of ducts 37 are provided inside the cowling panel 31. The duct 37 branches into two on its way from upstream to downstream. One end of the duct 37 is connected to the circular intake port 36 of the cowling panel 31. One other end of the duct 37 is connected to a substantially oblate base end of the upper wing 33, and the other end on the other side of the duct 37 is connected to a substantially oblate base end of the lower wing 34.

The base end of the upper wing 33 is open, and the upper wing 33 is formed hollow from the base end to a distal end. A slit-shaped discharge port 38 is formed on the lower surface of the upper wing 33 along the front edge. The base end of the lower wing 34 is open, and the lower wing 34 is formed hollow from the base end to a distal end. A slit-shaped discharge port 39 is formed on the lower surface of the lower wing 34 along the front edge. In this way, discharge ports 38 and 39 are formed in the upper wing 33 and the lower wing 34, and the downforce is adjusted by the upper wing 33 and the lower wing 34.

When traveling at low speeds, the flow rate of the airflow discharged from the discharge ports 38 and 39 decreases, and the pressure difference between the upper and lower surfaces of the upper wing 33 and the lower wing 34 increases. As a result, sufficient downforce is generated in the upper wing 33 and the lower wing 34, improving the operability and traveling stability of the straddle-type vehicle. When traveling at high speeds, the flow rate of the airflow discharged from the discharge ports 38 and 39 increases, and the pressure difference between the upper and lower surfaces of the upper wing 33 and the lower wing 34 becomes smaller. As a result, the downforce generated in the upper wing 33 and the lower wing 34 is reduced, and the running resistance of the straddle-type vehicle is reduced.

As described above, also with the front cowling 30 of the third embodiment, the operability and traveling stability of the straddle-type vehicle can be improved by downforce when traveling at low speeds, and the running resistance of the straddle-type vehicle due to downforce can be reduced when driving at high speeds.

Fourth Embodiment

Figure 7:
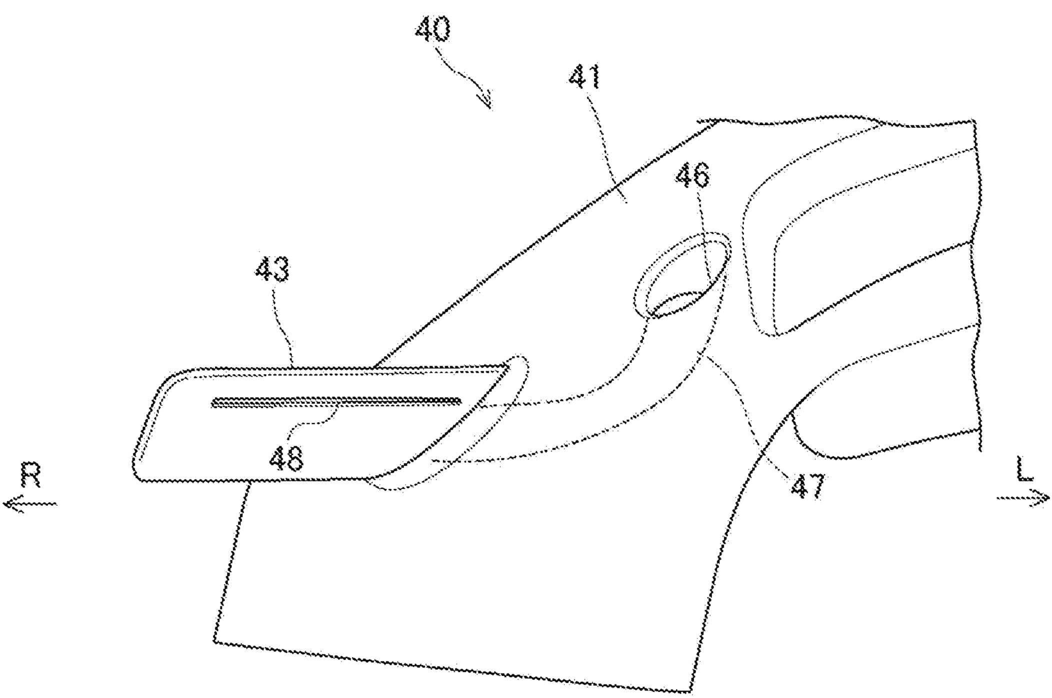
FIG. 7 is a perspective view of a front cowling according to a fourth embodiment as viewed diagonally from below.

Next, a front cowling of a fourth embodiment will be described with reference to FIG. 7. The front cowling of the fourth embodiment differs from the front cowling of the first embodiment in that a discharge port is formed in the cantilevered wing. Therefore, in the fourth embodiment, descriptions of the same configurations as in the first embodiment will be omitted as much as possible. FIG. 7 is a perspective view of the front cowling according to the fourth embodiment as viewed diagonally from below.

As shown in FIG. 7, wings 43 protrude from a cowling panel 41 of a front cowling 40 on both sides. The wing 43 is supported by the cowling panel 41 in a cantilevered manner. A pair of ducts 47 are provided inside the cowling panel 41. One end of the duct 47 is connected to a circular intake port 46 of the cowling panel 41, and the other end of the duct 47 is connected to a substantially oblate base end of the wing 43. The base end of the wing 43 is open, and the wing 43 is formed hollow from the base end to a distal end. A slit-shaped discharge port 48 is formed on the lower surface of the wing 43 along the front edge.

When traveling at low speeds, the flow rate of the airflow discharged from the discharge port 48 decreases, and the pressure difference between the upper and lower surfaces of the wing 43 increases, and sufficient downforce is generated in the wing 43, which improves the operability and traveling stability of the straddle-type vehicle. When traveling at high speeds, the flow rate of the airflow discharged from the discharge port 48 increases, the pressure difference between the upper and lower surfaces of the wing 43 becomes smaller, and the downforce generated in the wing 43 becomes smaller, thereby reducing the running resistance of the straddle-type vehicle. The wing 43 protrudes diagonally downward from the base end toward the distal end, making it difficult for the airflow discharged from the discharge port 48 to diffuse outward in the vehicle width direction.

As described above, also with the front cowling 40 of the fourth embodiment, the operability and traveling stability of the straddle-type vehicle can be improved by downforce when traveling at low speeds, and the running resistance of the straddle-type vehicle due to downforce can be reduced when driving at high speeds.

Fifth Embodiment

Figure 8:
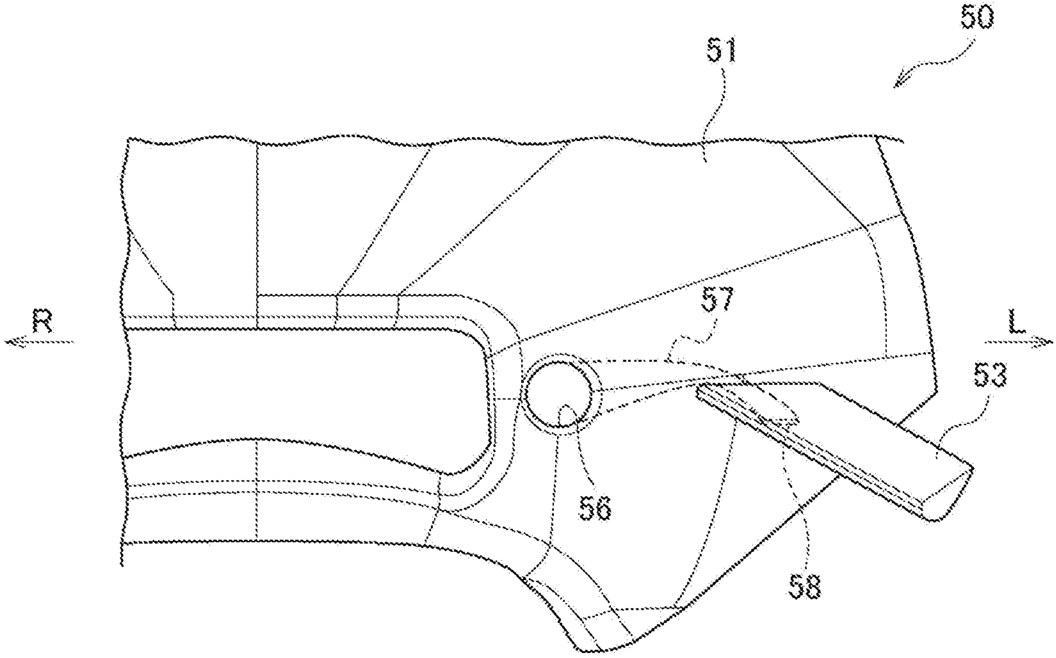
FIG. 8 is a front view of a front cowling according to a fifth embodiment.
Figure 9:
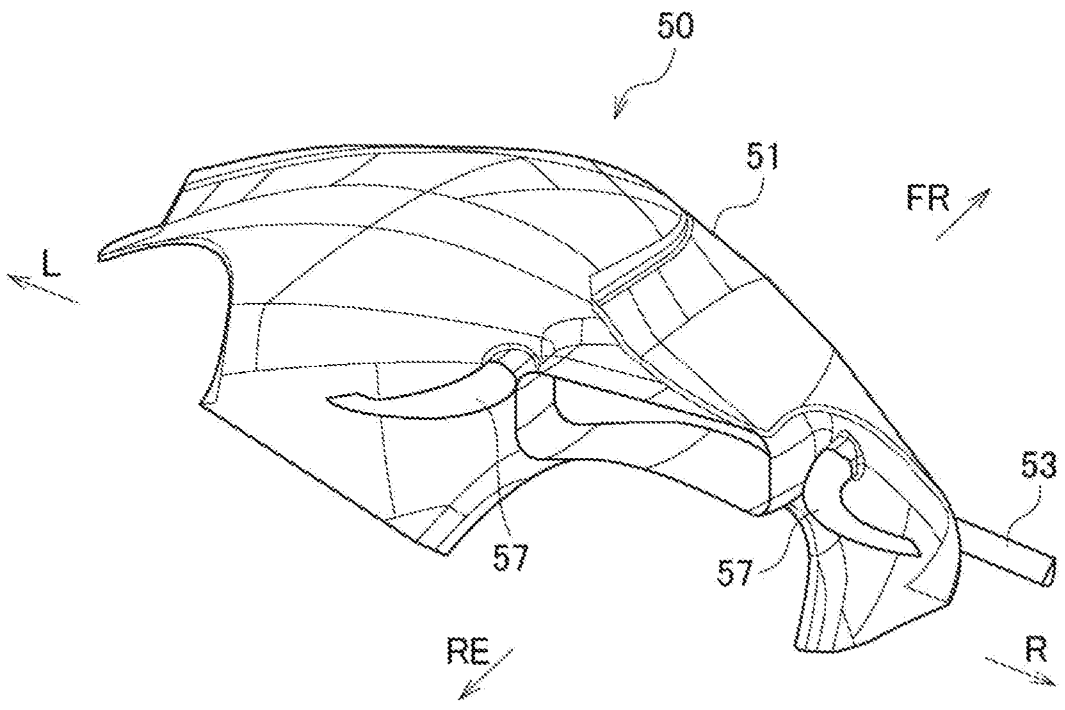
FIG. 9 is a perspective view of the front cowling according to the fifth embodiment as viewed diagonally from the rear.
Figure 10:
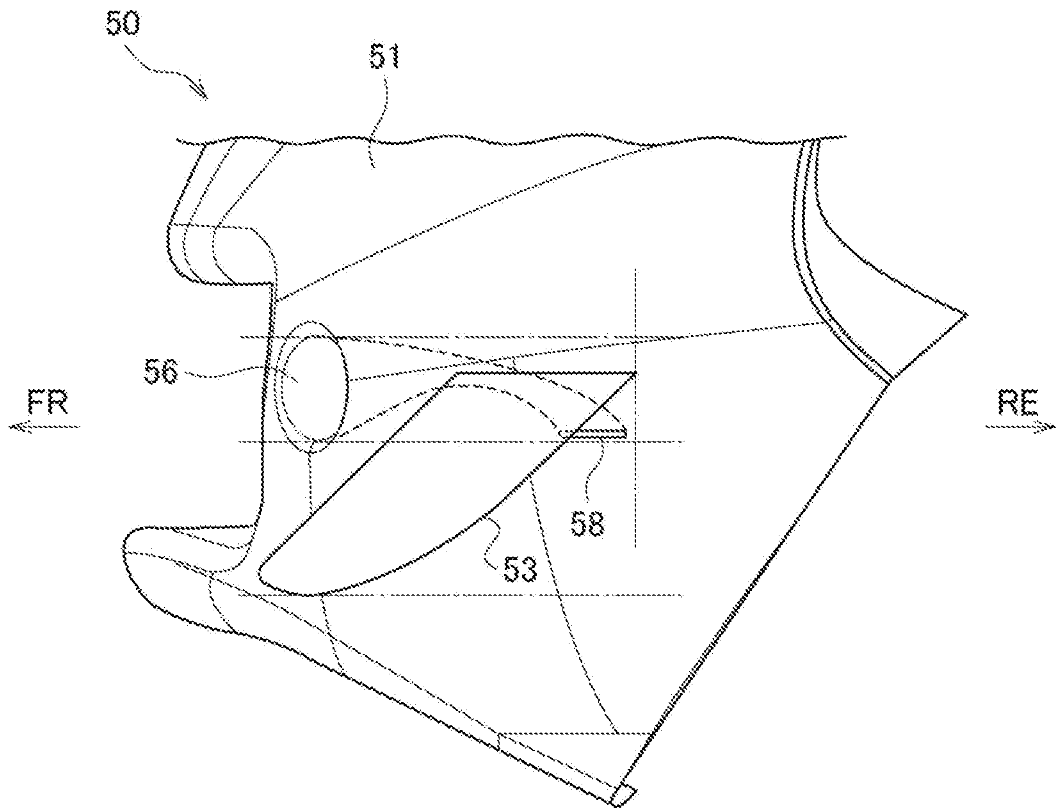
FIG. 10 is a side view of the front cowling according to the fifth embodiment.

Next, a front cowling of a fifth embodiment will be described with reference to FIGS. 8 to 10. The front cowling of the fifth embodiment differs from the front cowling of the first embodiment in that a discharge port is formed in the cowling panel. Therefore, in the fifth embodiment, descriptions of the same configurations as in the first embodiment will be omitted as much as possible. FIG. 8 is a front view of the front cowling according to the fifth embodiment. FIG. 9 is a perspective view of the front cowling according to the fifth embodiment as viewed diagonally from the rear. FIG. 10 is a side view of the front cowling according to the fifth embodiment.

As shown in FIGS. 8 and 9, wings 53 protrude from a cowling panel 51 of a front cowling 50 on both sides. The wing 53 is supported by the cowling panel 51 in a cantilevered manner. A circular intake port 56 is formed in a front portion of the cowling panel 51, and a slit-shaped discharge port 58 is formed in a side portion of the cowling panel 51. A pair of ducts 57 are provided inside the cowling panel 51. One end of the duct 57 is connected to the circular intake port 56 of the cowling panel 51, and the other end of the duct 57 is connected to the flat discharge port 58 of the cowling panel 51. The discharge port 58 is exposed in the space below the wing 53.

As shown in FIG. 10, the wing 53 protrudes diagonally forward from the cowling panel 51, and a base end of the wing 53 is located at the rearmost position when viewed from the side. The discharge port 58 extends in the front-rear direction in the cowling panel 51, and the discharge port 58 is located forward of a rear end of the wing 53 when viewed from the side. Therefore, at least on the base end side of the wing 53, airflow can flow rearward along the lower surface of the wing 53. The discharge port 58 is located below an upper end of the intake port 56 and above a lower end of the intake port 56. The height difference between the intake port 56 and the discharge port 58 is reduced, and airflow is smoothly guided from the intake port 56 to the discharge port 58.

Further, the wing 53 protrudes diagonally downward from the cowling panel 51 toward the side, and a distal end of the wing 53 is located at the lowest position when viewed from the side. The discharge port 58 is located above the distal end of the wing 53, and a portion of the discharge port 58 overlaps the wing 53 when viewed from the side. This makes it difficult for the airflow discharged from the discharge port 58 to diffuse outward in the vehicle width direction, and the airflow tends to separate the traveling wind from the lower surface of the wing 53. Further, the wing 53 covers the discharge port 58 from the side, making it less noticeable, and it also becomes difficult for foreign matter such as sand and dust to enter the discharge port 58.

When traveling at low speeds, the flow rate of the airflow discharged from the discharge port 58 decreases, and the pressure difference between the upper and lower surfaces of the wing 53 increases, and sufficient downforce is generated in the wing 53, which improves the operability and traveling stability of the straddle-type vehicle. When traveling at high speeds, the flow rate of the airflow discharged from the discharge port 58 increases, the pressure difference between the upper and lower surfaces of the wing 53 becomes smaller, and the downforce generated in the wing 53 becomes smaller, thereby reducing the running resistance of the straddle-type vehicle. In this way, the discharge port 58 can be formed not only in the wing 53 but also in the cowling panel 51 as long as it is near the lower surface of the wing 53.

As described above, also in the front cowling 50 of the fifth embodiment, with a simple structure, the operability and traveling stability of the straddle-type vehicle can be improved by downforce when traveling at low speeds, and the running resistance of the straddle-type vehicle due to downforce can be reduced when driving at high speeds.

Sixth Embodiment

Figure 11:
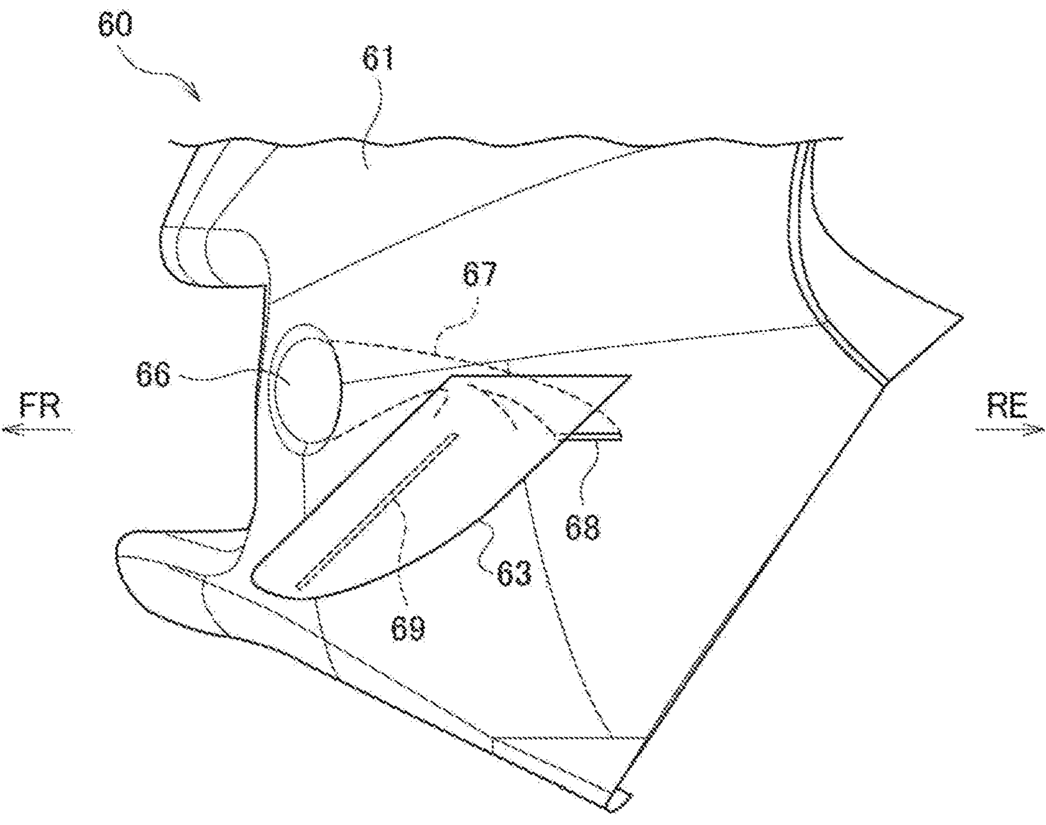
FIG. 11 is a side view of a front cowling according to a sixth embodiment.

Next, a front cowling of a sixth embodiment will be described with reference to FIG. 11. The front cowling of the sixth embodiment differs from the front cowling of the first embodiment in that a discharge port is formed in the cowling panel and the wing. Therefore, in the sixth embodiment, descriptions of the same configurations as in the first embodiment will be omitted as much as possible. FIG. 11 is a side view of the front cowling according to the sixth embodiment.

As shown in FIG. 11, wings 63 protrude from a cowling panel 61 of a front cowling 60 on both sides. The wing 63 is supported by the cowling panel 61 in a cantilevered manner.

A circular intake port 66 is formed in a front portion of the cowling panel 61, and a slit-shaped discharge port 68 is formed in a side portion of the cowling panel 61. As in the fifth embodiment, the discharge port 68 is located forward of a rear end of the wing 63, below an upper end of the intake port 66, and above a lower end of the intake port 66. Further, the discharge port 68 is located above the distal end of the wing 63 in side view, and the discharge port 68 overlaps the wing 63.

A duct 67 is provided inside the cowling panel 61. The duct 67 branches into two on its way from upstream to downstream. One end of the duct 67 is connected to the circular intake port 66 of the cowling panel 61. One other end of the duct 67 is connected to a flat discharge port 68 of the cowling panel 61, and the other end on the other side of the duct 67 is connected to an oblate base end of the wing 63. The base end of the wing 63 is open, and the wing 63 is formed hollow from the base end to the distal end. A slit-shaped discharge port 69 is formed on the lower surface of the wing 63 along a front edge. Airflow is discharged from two directions to the lower surface of the wing 63 through the discharge ports 68 and 69.

When traveling at low speeds, the flow rate of the airflow discharged from the discharge ports 68 and 69 decreases, and the pressure difference between the upper and lower surfaces of the wing 63 increases, and sufficient downforce is generated in the wing 63, which improves the operability and traveling stability of the straddle-type vehicle. When traveling at high speeds, the flow rate of the airflow discharged from the discharge ports 68 and 69 increases, the pressure difference between the upper and lower surfaces of the wing 63 becomes smaller, and the downforce generated in the wing 63 becomes smaller, thereby reducing the running resistance of the straddle-type vehicle. In this way, the airflow effect can be enhanced by forming the discharge ports 68 and 69 in both the wing 63 and the cowling panel 61.

As described above, also with the front cowling 60 of the sixth embodiment, the operability and traveling stability of the straddle-type vehicle can be improved by downforce when traveling at low speeds, and the running resistance of the straddle-type vehicle due to downforce can be reduced when driving at high speeds.

Seventh Embodiment

Figure 12:
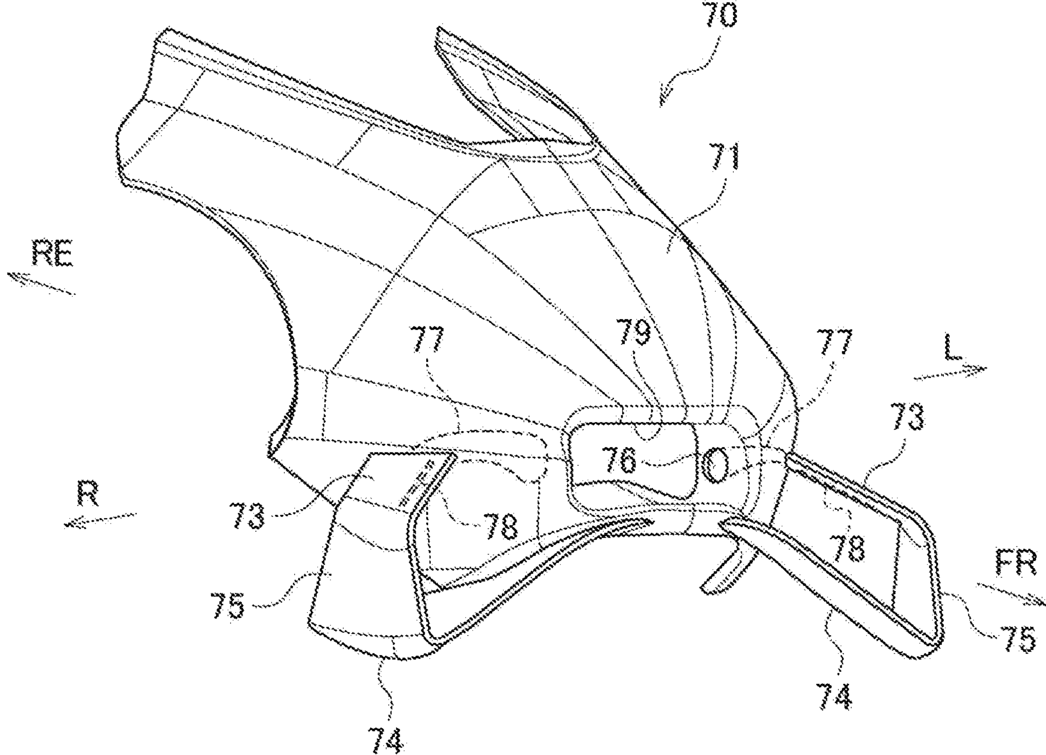
FIG. 12 is a perspective view of a front cowling according to a seventh embodiment.

Next, a front cowling of a seventh embodiment will be described with reference to FIG. 12. The front cowling of the seventh embodiment differs from the front cowling of the first embodiment in that an intake port is formed on the inner surface of the air guide port. Therefore, in the seventh embodiment, descriptions of the same configurations as in the first embodiment will be omitted as much as possible. FIG. 12 is a perspective view of the front cowling according to the seventh embodiment.

As shown in FIG. 12, a cowling panel 71 of the front cowling 70 is provided with an upper wing 73, a lower wing 74, and a side wing 75. A cylindrical air guide port 79 is formed in a front portion of the cowling panel 71, and an intake port 76 is opened on the inner surface of the air guide port 79. A duct 77 is provided inside the cowling panel 71. One end of the duct 77 is connected to the circular intake port 76 of the cowling panel 71, and the other end of the duct 77 is connected to the substantially oblate base end of the upper wing 73. The upper wing 73 is formed hollow, and a slit-shaped discharge port 78 is formed on the lower surface of the upper wing 73 along the front edge.

When traveling at low speeds, the flow rate of the airflow discharged from the discharge port 78 decreases, and the pressure difference between the upper and lower surfaces of the upper wing 73 increases, and sufficient downforce is generated in the upper wing 73, which improves the operability and traveling stability of the straddle-type vehicle. When traveling at high speeds, the flow rate of the airflow discharged from the discharge port 78 increases, the pressure difference between the upper and lower surfaces of the upper wing 73 becomes smaller, and the downforce generated in the upper wing 73 becomes smaller, thereby reducing the running resistance of the straddle-type vehicle. Since sufficient downforce is also generated in the lower wing 74, the operability and traveling stability are ensured even when traveling at high speeds.

As described above, also with the front cowling 70 of the seventh embodiment, the operability and traveling stability of the straddle-type vehicle can be improved by downforce when traveling at low speeds, and the running resistance of the straddle-type vehicle due to downforce can be reduced when driving at high speeds.

Eighth Embodiment

Figure 13:
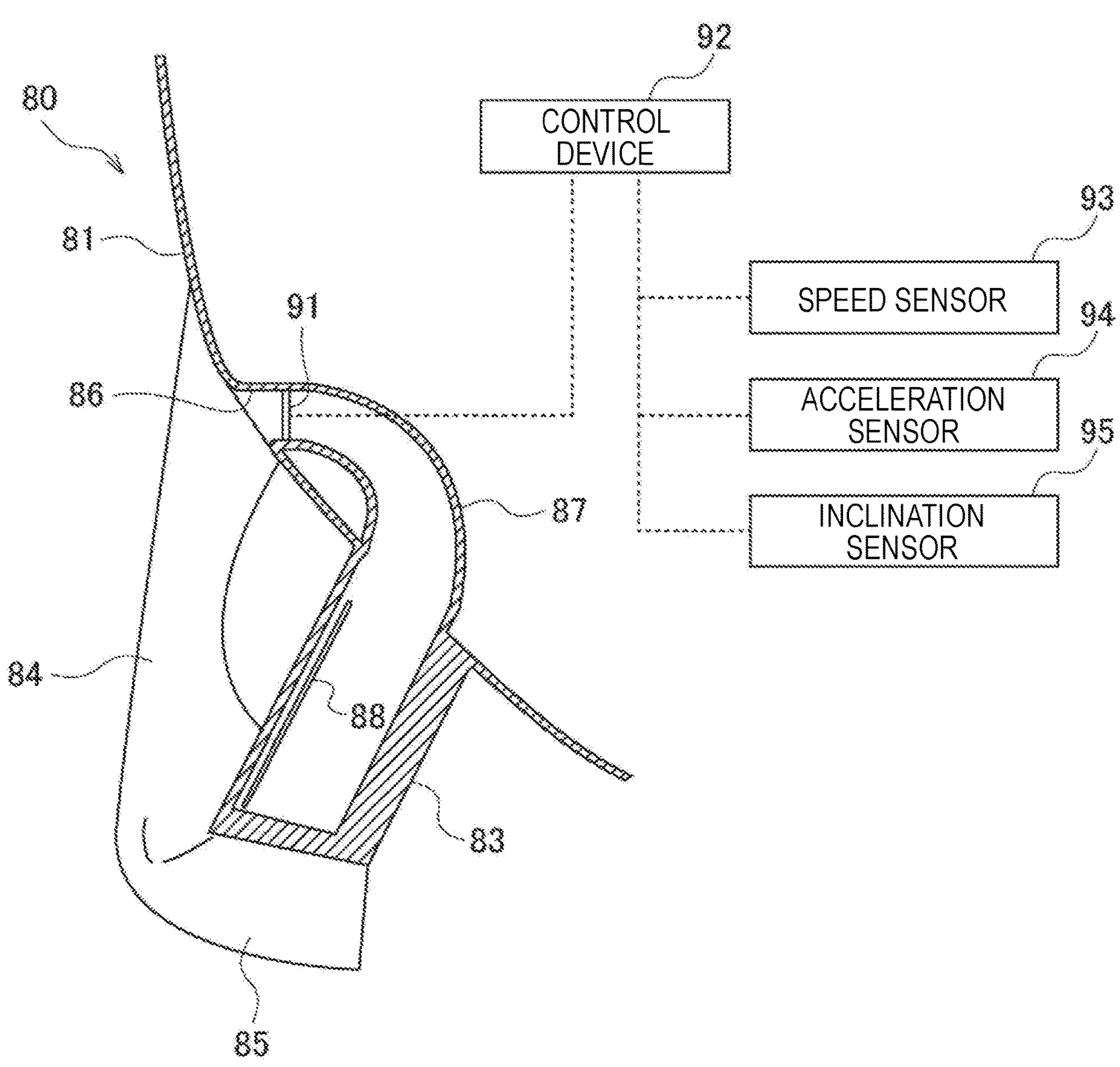
FIG. 13 is a schematic cross-sectional view of a front cowling according to an eighth embodiment.

Next, a front cowling of an eighth embodiment will be described with reference to FIG. 13. The front cowling of the eighth embodiment differs from the front cowling of the first embodiment in that a control valve is provided. Therefore, in the eighth embodiment, descriptions of the same configurations as in the first embodiment will be omitted as much as possible. FIG. 13 is a schematic cross-sectional view of the front cowling according to the eighth embodiment.

As shown in FIG. 13, a cowling panel 81 of the front cowling 80 is provided with an upper wing 83, a lower wing 84, and a side wing 85. A duct 87 is provided inside the cowling panel 81. One end of the duct 87 is connected to a circular intake port 86 of the cowling panel 81, and the other end of the duct 87 is connected to a substantially oblate base end of the upper wing 83. The base end of the upper wing 83 is open, and the upper wing 83 is formed hollow from the base end to a distal end. A slit-shaped discharge port 88 is formed on a lower surface of the upper wing 83 along a front edge.

A control valve 91 is provided in the air guide path of the duct 87 to control the flow rate of the traveling wind. By opening and closing the control valve 91 according to the vehicle posture and traveling state such as acceleration and deceleration, the flow rate of the airflow discharged from the discharge port 88 of the upper wing 83 changes, and thereby the running resistance, operability, and traveling stability are adjusted. The straddle-type vehicle is provided with a control device 92, and the control device 92 controls opening and closing of the control valve 91. The control device 92 detects the traveling state of the vehicle according to detection signals from a speed sensor 93, an acceleration sensor 94, and an inclination sensor 95, and the control valve 91 is dynamically opened and closed by the control device 92 according to this traveling state.

During deceleration, the control valve 91 is automatically closed by the control device 92, and the flow rate of the airflow discharged from the discharge port 88 is reduced. The pressure difference between the upper and lower surfaces of the upper wing 83 increases, and sufficient downforce is generated in the upper wing 83, thereby improving the operability and traveling stability of the straddle-type vehicle. When accelerating in the upright position, the control valve 91 is automatically opened by the control device 92, and the flow rate of the airflow discharged from the discharge port 88 increases. The pressure difference between the upper and lower surfaces of the upper wing 83 becomes smaller, the downforce generated in the upper wing 83 becomes smaller, and the running resistance of the straddle-type vehicle is reduced.

In the eighth embodiment, the control valve 91 is automatically opened and closed by a motor, an electromagnetic valve, etc., but the control valve may be opened and closed manually by a cable. Moreover, although the configuration in which the control valve is provided in the front cowling of the first embodiment has been described as an example, the control valve may be provided in the front cowlings of the second to seventh embodiments. Further, although the traveling state is detected according to the detection signals from the speed sensor 93, the acceleration sensor 94, and the inclination sensor 95, the traveling state may be detected according to the detection signal from at least one of these sensors. The traveling state may be detected according to detection signals from sensors other than the speed sensor 93, the acceleration sensor 94, and the inclination sensor 95.

As described above, in the front cowling 80 of the eighth embodiment, the operability and traveling stability can be improved by downforce during deceleration, and the running resistance due to downforce can be reduced when accelerating in an upright position.

In each embodiment, the intake port is formed in a circular shape, but the shape of the intake port is not particularly limited as long as the intake port can take in the traveling wind from the front of the vehicle. For example, the intake port may be formed in a rectangular shape.

Furthermore, in each of the embodiments, the discharge port is formed in a slit shape, but the shape of the discharge port is not particularly limited as long as the discharge port can discharge the traveling wind as an airflow. For example, the discharge port may be numerous small holes arranged in a straight line.

Further, in each of the embodiments, the wing is formed into a plate shape in a horizontal position, but the shape of the wing is not particularly limited as long as the rear edge of the wing is located higher than the front edge of the wing.

In each embodiment, the space below the wings (upper wing, lower wing) refers to the space along the lower surface of the wing. Also, discharging airflow into the space below the wing means discharging airflow toward the lower surface of the wing.

Moreover, a positional relationship between the discharge port and the wing is not particularly limited as long as the discharge port can discharge airflow into the space below the wing.

Further, the front cowling of each embodiment is not limited to the above-mentioned straddle-type vehicle, but may be employed in other types of straddle-type vehicles. Note that straddle-type vehicles are not limited to vehicles in general in which a driver rides while straddling the seat, but also include scooter-type vehicles in which the driver rides without straddling the seat.

As described above, a first aspect is a front cowling including a cowling panel (11, 21, 31, 41, 51, 61, 71, 81) that covers the front portion of the vehicle from the front and sides, and a wing (13, 24, 33, 34, 43, 53, 63, 73, and 83) that protrudes laterally from the cowling panel, in which the rear edge of the wing is located higher than the front edge, and an air guide path (90) is formed to take in traveling wind from the front of the vehicle and discharges the traveling wind as an airflow into the space below the wing. According to this configuration, since the rear edge of the wing is positioned higher than the front edge, when the wing receives the traveling wind, the pressure on the lower surface of the wing is lower than the pressure on the upper surface of the wing. Meanwhile, the traveling wind in the air guide path is discharged into the space below the wing as an airflow, increasing the pressure on the lower surface of the wing. When traveling at low speeds, the flow rate of the airflow discharged into the space below the wing is reduced, increasing the pressure difference between the upper and lower surfaces of the wing, and increasing downforce, which improves the operability and traveling stability of the straddle-type vehicle. When traveling at high speeds, the flow rate of the airflow discharged into the space below the wing increases, reducing the pressure difference between the upper and lower surfaces of the wing, and reducing downforce, which reduces the running resistance of the straddle-type vehicle.

A second aspect is that in the first aspect, intake ports (16, 26, 36, 46, 76, 86) for taking in the traveling wind are formed in the cowling panel, and discharge ports (18, 28, 38, 39, 48, 78, 88) are formed on the lower surface of the wing for discharging the traveling wind as an airflow, and the air guide path takes in the traveling wind from the intake ports and discharges the airflow from the discharge ports into the space below the wing. According to this configuration, the airflow is directly discharged from the discharge port into the space below the upper wing, increasing the pressure on the lower surface of the upper wing.

A third aspect is that in the second aspect, the discharge port is located closer to the front edge than the middle of the lower surface of the wing in the front-rear direction. According to this configuration, the airflow can flow rearward along the lower surface of the wing.

A fourth aspect is that in the second and third aspects, the discharge port is formed from the base end of the wing toward the distal end. According to this configuration, the airflow can flow over a wide range from the base end to the distal end of the wing.

A fifth aspect is that in any one of the second to fourth aspects, a duct (17, 27, 37, 47, 77, 87) provided inside the cowling panel is included, and one end of the duct is connected to the intake port, the other end of the duct is connected to the base end of the wing, the upstream side of the air guide path is formed inside the duct, the downstream side of the air guide path is formed inside the wing, and the communication port (4) between the duct and the wing is located below the upper end of the intake port and above the lower end of the intake port.

According to this configuration, the height difference between the intake port and the communication port is reduced, and the airflow is smoothly guided from the intake port through the communication port to the discharge port.

A sixth aspect is that in the first aspect, an intake port (56, 66) for taking in the traveling wind is formed in the front portion of the cowling panel, and a discharge port (57, 68, 69) for discharging the traveling wind as an airflow is formed in the side portion of the cowling panel, the discharge port is exposed to the space below the wing, and the air guide path takes in the traveling wind from the intake port and discharges the airflow from the discharge port to the space below the wing. According to this configuration, the airflow is directly discharged from the discharge port into the space below the wing with the simple structure, and the pressure on the lower surface of the upper wing is increased.

A seventh aspect is that in the sixth aspect, the discharge port is located in front of the rear end of the wing in side view. According to this configuration, the airflow can flow rearward along the lower surface of the wing.

An eighth aspect is that in the sixth aspect or the seventh aspect, the discharge port is located below the upper end of the intake port and above the lower end of the intake port. According to this configuration, the height difference between the intake port and the discharge port is reduced, and airflow is smoothly guided from the intake port to the discharge port.

A ninth aspect is that in any one of the sixth to eighth aspects, the wing protrudes diagonally downward from the cowling panel toward the side, and the discharge port is located above the distal end of the wing. According to this configuration, the airflow discharged from the discharge port becomes difficult to diffuse outward in the vehicle width direction, and the airflow tends to separate the traveling wind from the lower surface of the wing.

A tenth aspect is that in the ninth aspect, the discharge port overlaps the wing in side view. According to this configuration, the airflow discharged from the discharge port becomes difficult to diffuse outward in the vehicle width direction, and the airflow makes it easier for the traveling wind to be separated from the lower surface of the wing.

An eleventh aspect is that in any one of the first to tenth aspects, the air guide path is provided with a control valve (91) that controls the flow rate of the airflow. According to this configuration, by opening and closing the control valve according to the vehicle posture and traveling state such as acceleration and deceleration, the flow rate of the airflow discharged from the discharge port changes, and thereby the running resistance, operability, and traveling stability are adjusted.

A twelfth aspect is that in the eleventh aspect, the control valve is dynamically opened and closed according to the traveling state, and when accelerating in an upright position, the control valve is opened to increase the flow rate of airflow, and when decelerating, the control valve is closed to reduce airflow. According to this configuration, downforce is reduced during acceleration in an upright position, reducing the running resistance, and during deceleration, downforce is increased, improving the operability and the traveling stability.

Although the present embodiment has been described, other embodiments may be created by combining the above embodiments and modifications in whole or in part.

Further, the technology of the present embodiment is not limited to the above-described embodiments, and various changes, replacement, and modification may be made without departing from the spirit of the technical idea. Furthermore, if the technical idea can be realized in a different manner due to advances in technology or other derived technologies, the invention may be implemented using that method. Accordingly, the claims cover all embodiments that may fall within the scope of the technical spirit.

What is claimed is:

1. A front cowling comprising:

a cowling panel that covers a front portion of a vehicle from the front and sides; and a wing that protrudes laterally from the cowling panel, wherein the rear edge of the wing is located higher than a front edge of the wing, an air guide path is formed that takes in a traveling wind from the front of the vehicle and discharges the traveling wind as an airflow into a space below the wing, an intake port is formed in the cowling panel to take in the traveling wind a discharge port is formed in a lower surface of the wing to discharge the traveling wind as an airflow, and the air guide path takes in the traveling wind from the intake port, and discharges the airflow from the discharge port into the space below the wing.

2. The front cowling according to claim 1, wherein the discharge port is located closer to the front edge than the middle of the lower surface of the wing in a front-rear direction.

3. The front cowling according to claim 1, wherein the discharge port is formed from a base end of the wing toward a distal end.

4. The front cowling according to claim 1, further comprising:

a duct provided inside the cowling panel, wherein one end of the duct is connected to the intake port, and the other end of the duct is connected to the base end of the wing, an upstream side of the air guide path is formed inside the duct, and a downstream side of the air guide path is formed inside the wing, and a communication port between the duct and the wing is located below an upper end of the intake port and above a lower end of the intake port.

5. The front cowling according to claim 1, wherein the air guide path is provided with a control valve that controls a flow rate of the airflow.

6. The front cowling according to claim 5, wherein the control valve is dynamically opened and closed according to a traveling state, and when accelerating in an upright position, the control valve is opened to increase the flow rate of the airflow, and when decelerating, the control valve is closed to reduce the flow rate of the airflow.

7. A front cowling comprising:

a cowling panel that covers a front portion of a vehicle from the front and sides; and a wing that protrudes laterally from the cowling panel, wherein the rear edge of the wing is located higher than a front edge of the wing an air guide path is formed that takes in a traveling wind from the front of the vehicle and discharges the traveling wind as an airflow into a space below the wing, an intake port for taking in the traveling wind is formed in the front portion of the cowling panel, a discharge port for discharging the traveling wind as an airflow is formed in a side portion of the cowling panel, and the discharge port is exposed to the space below the wing, the air guide path takes in traveling wind from the intake port and discharges airflow from the discharge port into the space below the wing, and the discharge port is located forward of a rear end of the wing in side view.

8. The front cowling according to claim 7, wherein the discharge port is located below an upper end of the intake port and above a lower end of the intake port.

9. A front cowling comprising:

a cowling panel that covers a front portion of a vehicle from the front and sides; and a wing that protrudes laterally from the cowling panel, wherein the rear edge of the wing is located higher than a front edge of the wing, an air guide path is formed that takes in a traveling wind from the front of the vehicle and discharges the traveling wind as an airflow into a space below the wing, an intake port for taking in the traveling wind is formed in the front portion of the cowling panel, a discharge port for discharging the traveling wind as an airflow is formed in a side portion of the cowling panel, and the discharge port is exposed to the space below the wing, the air guide path takes in traveling wind from the intake port and discharges airflow from the discharge port into the space below the wing, the wing protrudes diagonally downward and laterally from the cowling panel, and the discharge port is located above a distal end of the wing.

10. The front cowling according to claim 9, wherein the discharge port overlaps the wing in a side view.

* * * * *